(No Model.)

L. B. PRAHAR.
FASTENING FOR POCKET BOOK, PURSE, AND HAND BAG FRAMES.

No. 339,577. Patented Apr. 6, 1886.

WITNESSES:
Chas. Niaa
C. Sedgwick

INVENTOR:
L. B. Prahar
BY Munn & Co.
ATTORNEYS.

United States Patent Office.

LOUIS B. PRAHAR, OF BROOKLYN, ASSIGNOR TO PRAHAR & SHEPARD, OF NEW YORK, N. Y.

FASTENING FOR POCKET-BOOK, PURSE, AND HAND-BAG FRAMES.

SPECIFICATION forming part of Letters Patent No. 339,577, dated April 6, 1886.

Application filed February 2, 1886. Serial No. 190,612. (No model.)

*To all whom it may concern:*

Be it known that I, LOUIS B. PRAHAR, of Brooklyn, in the county of Kings and State of New York, have invented certain new and useful Improvements in Fastenings for Pocket-Book, Purse, and Hand-Bag Frames, of which the following is a full, clear, and exact description.

Reference is to be had to the accompanying drawings, forming part of this specification, in which similar letters of reference indicate corresponding parts in both the figures.

Figure 1:
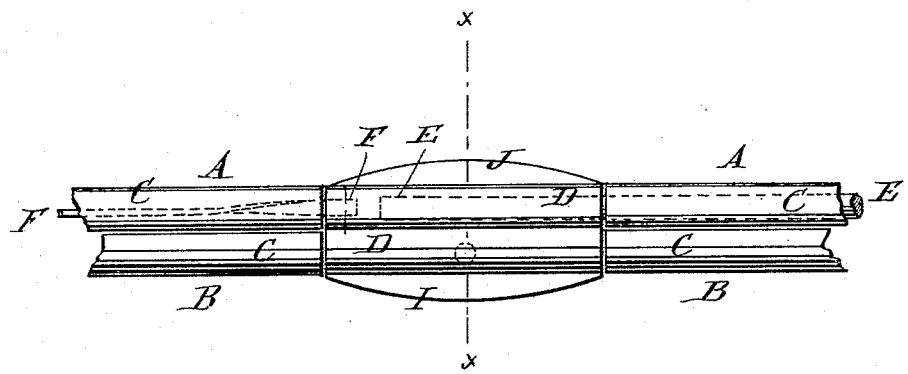
Figure 2:
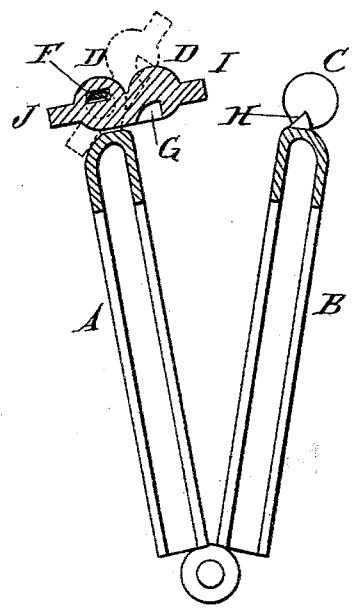

Figure 1 is a plan view of the middle part of a pocket-book frame to which my improvement has been applied. Fig. 2 is a sectional end elevation of the frame, taken through the line $x\ x$, Fig. 1.

The object of this invention is to improve the construction of spring-fastenings for pocket-book, purse, and hand-bag frames in such a manner as will prevent the latch of the fastening from being turned so far back as to break or injure the spring.

The invention consists in the combination, with the frame having a recess, the pivoting-wire, and the torsion-spring, of a latch provided with a rearwardly-projecting flange to come in contact with the side of the frame and prevent the said latch from being turned so far back as to break or injure the said spring, as will be hereinafter fully described.

A B represent the parts of a pocket-book frame, the ends of which are hinged to each other in the ordinary manner.

Upon the top of the middle parts of the frame are formed tubular projections C, the middle parts of which are cut away to form a recess to receive the latch D. The latch D is hinged to the part A of the frame by a wire, E, passing in through one part of the tubular projection C, and entering a hole formed in one end of the latch D, the outer side of which is formed with projections corresponding in shape and size with the projections C. The latch D is held down or closed by a torsion-spring, F, one end of which enters a similarly-shaped hole in the end of the said latch opposite the pivoting-wire E, and its other end enters and is secured in and to the part of the projection C opposite that in which the pivoting-wire E is placed.

In the under side of the forward part of the latch D is formed a recess, G, to receive the catch or projection H, formed upon or attached to the part B of the frame, and upon which the said latch is held by the elasticity of the spring F.

Upon the forward edge of the latch D is formed a projecting flange, I, for convenience in raising the latch D to open the frame A B.

As thus far described there is nothing new in the construction.

Upon the rear edge of the latch D is formed a projection or flange, J, which is preferably made in the same form as the flange I, to give symmetry to the fastening. When the latch D is turned back, the flange J strikes against the side of the part A of the frame and acts as a stop to prevent the said latch from being turned so far back as to break or injure the spring F.

When the fastening is constructed in the ordinary manner without my improvement, the backward movement of the latch D is limited only by the spring F, and the strain thus put upon the said spring very soon breaks the spring or injures it so as to destroy its elasticity, or weaken it to such an extent as to render it practically useless. By my improvement this fatal defect is remedied and the fastening is made durable, as it is impossible for the latch to be turned so far back as to injure or weaken the spring.

Having thus described my invention, I claim as new and desire to secure by Letters Patent—

In a fastening for pocket-book, purse, and hand-bag frames, the combination, with the frame A B, of a spring-latch, D, having a rearwardly-projecting flange, J, to come in contact with the side of the frame and prevent the said latch from being turned so far back as to break or injure the spring, substantially as herein shown and described.

LOUIS B. PRAHAR.

Witnesses:
JAMES T. GRAHAM,
C. SEDGWICK.